United States Patent [19]
Park et al.

[11] Patent Number: 5,527,749
[45] Date of Patent: Jun. 18, 1996

[54] DIELECTRIC CERAMIC COMPOSITION FOR HIGH FREQUENCIES AND METHOD FOR PREPARATION OF THE SAME

[75] Inventors: Yung Park; Nam-Hee Cho; Yoon Ho Kim, all of Seoul, Rep. of Korea

[73] Assignee: Korea Institute of Science and Technology, Seoul, Rep. of Korea

[21] Appl. No.: 370,580

[22] Filed: Dec. 27, 1994

[30] Foreign Application Priority Data

Jan. 11, 1994 [KR] Rep. of Korea ..................... 349/1994

[51] Int. Cl.⁶ .................................................. C04B 35/49
[52] U.S. Cl. ..................................................... 501/134
[58] Field of Search ............................................. 501/134

[56] References Cited

U.S. PATENT DOCUMENTS

| | | | |
|---|---|---|---|
| 2,668,118 | 2/1954 | Jonker | 501/134 |
| 4,102,696 | 7/1978 | Katsube et al. | 501/134 |
| 4,665,041 | 5/1987 | Higuchi et al. | 501/134 |
| 5,130,281 | 7/1992 | Sano et al. | 510/134 |

*Primary Examiner*—Deborah Jones
*Attorney, Agent, or Firm*—Darby & Darby

[57] ABSTRACT

A dielectric ceramic composition for high frequencies and a method of preparation of such composition is described. The dielectric ceramic composition essentially consists of $ZrO_2$, $TiO_2$ and $SnO_2$, represented by the following empirical formula: $Zr_{1-x}Sn_xTiO_4$, wherein x is in a range of 0.1 to 0.4.

2 Claims, No Drawings

DIELECTRIC CERAMIC COMPOSITION FOR HIGH FREQUENCIES AND METHOD FOR PREPARATION OF THE SAME

BACKGROUND OF THE INVENTION

Field of the invention

The present invention relates, in general, to a dielectric ceramic composition for high frequencies and, more particularly, to a dielectric ceramic composition of a system, $ZrO_2$—$TiO_2$—$SnO_2$, which exhibits superior electrical quality factor Q, dielectric constant k, and temperature coefficient of resonant frequency $T_f$ in high frequency regions. Also, the present invention concerns a method for preparing the dielectric ceramic composition.

Description of Prior Art

Generally, in a high frequency region, various dielectric ceramic compositions have useful electrical properties for a wide range of uses, including global positioning systems, dielectric resonators, dielectric substrates for microwave integrated circuits, etc. Recent trends to use higher frequencies in microwave systems have demanded dielectric ceramic compositions with better electrical properties, such as improved quality factor Q, dielectric constant k, and stable temperature coefficient of resonant frequency $T_f$.

Among conventional dielectric ceramic compositions for high frequencies, one suggested in U.S. Pat. No. 4,665,041 has been known to be superior in quality factor Q and dielectric constant k. The dielectric ceramic composition of the cited patent is composed of a main component of a $TiO_2$—$ZrO_2$—$SnO_2$ system, and additives comprising NiO, ZnO, $Sb_2O_3$, $Nb_2O_3$, $Ta_2O_5$ and $WO_3$. However, the dielectric ceramic composition of the cited patent consists of too many materials, thus the production cost is high and it is difficult to control the precise production process.

SUMMARY OF THE INVENTION

It is an object of the present invention to provide a dielectric ceramic composition for high frequencies which consists of a simple component system that exhibits superior electrical properties including quality factor Q, dielectric constant k, and temperature coefficient of resonant frequency $T_f$.

It is another object of the present invention to provide a dielectric ceramic composition for high frequencies which is easy to prepare.

It is a further object of the present invention to provide a method for preparing a dielectric ceramic composition.

In accordance with an aspect of the present invention, there is provided a dielectric ceramic composition essentially consisting of zirconium oxide ($ZrO_2$) titanium oxide ($TiO_2$) and stannic oxide ($SnO_2$) represented by the following empirical formula:

$$Zr_{1-x}Sn_xTiO_4$$

wherein x is in a range of 0.1 to 0.4.

In accordance with another aspect of the present invention, a method is provided for preparing a dielectric ceramic material, comprising the steps of:

mixing powdered zirconium oxide ($ZrO_2$), titanium oxide ($TiO_2$), and stannic oxide ($SnO_2$) to give a mixture having the following empirical formula:

$$Zr_{1-x}Sn_xTiO_4$$

wherein x is in a range of 0.1 to 0.4;

calcining the mixture at a temperature of 1,000° to 1,200° C., sintering the mixture at a temperature of 1,500° to 1,800° C.;

annealing the resulting sintered body at a temperature of 1,250° to 1,400° C.; and rapidly quenching the resulting annealed body to room temperature.

These and other objects and advantages of the present invention will become more apparent in the following description.

DETAILED DESCRIPTION OF THE INVENTION

The dielectric ceramic composition for high frequencies according to the present invention consists essentially of a three-component system comprising zirconium oxide ($ZrO_2$), titanium oxide ($TiO_2$), and stannic oxide ($SnO_2$), represented by the following empirical formula:

$$Zr_{1-x}Sn_xTiO_4$$

wherein x is in a range of 0.1 to 0.4.

In accordance with the present invention, a dielectric ceramic composition is prepared as follows.

First, powdered zirconium oxide ($ZrO_2$), titanium oxide ($TiO_2$), and stannic oxide ($SnO_2$) are weighed on a balance and mixed, to give a mixture having the above empirical formula. The mixture is calcined at a temperature of 1,000° to 1,200° C., pulverized and molded. Then the resulting molded body is subjected to sintering at a temperature of 1,500° to 1,800° C. Following completion of sintering, an annealing process is carried out in such a manner that the sintered body is cooled at a constant rate to a temperature of 1,250° to 1,400° C. Thereafter, the resulting body is quenched to room temperature to obtain a desired dielectric ceramic composition.

It was observed that sintering temperatures departing from the range of 1,500° to 1,800° C. deteriorated the specimens. For example, in the case where the sintering temperature exceeded 1,800° C., the sintered body was poor in appearance because of partial dissolution. On the other hand, sintering temperatures lower than 1,500° C. prevented the sintered body from contracting sufficiently, which resulted in reduced quality factor Q.

With regard to the annealing temperature, it is preferably in a range of 1,250° to 1,400° C. For example, if too high a temperature is employed, crystal grains are formed as the sintering proceeds, providing no improvement in quality factor Q to the dielectric ceramic composition. On the other hand, if too a low temperature is employed, it takes a long time to remove lattice irregularities from the crystal grains, which also prevents quality factor Q from being improved.

In the quenching step, a slow quenching rate adversely affects quality factor Q and dielectric constant k.

At 9 GHz, a dielectric ceramic material as in the present invention exhibits a dielectric constant k of not less than 35 and a quality factor Q of not less than 4,000, as well as a stable temperature coefficient of resonant frequency $T_f$. Consequently, the dielectric ceramic composition according to the present invention can be applied for various uses, especially global positioning systems and dielectric resonators.

The preferred embodiments of the present invention will now be further described with reference to the following specific examples.

EXAMPLE

Powdered zirconium oxide ($ZrO_2$), titanium oxide ($TiO_2$), and stannic oxide ($SnO_2$), all having a purity of above 99%, were weighed in the ratios given in Table 1. Using a nylon jar and a zirconium oxide ball, the weighed powders were mixed for 2 hours in a planetary mill. Distilled water was used as a dispersing medium.

Thereafter, the resulting slurry was dried and subjected to calcination at a temperature of 1,000° to 1,200° C., followed by pulverization of the calcined body. The pulverized mixture was molded through a dry press into specimens which were 4.0, 4.5 and 5.0 mm thick, with a diameter of 10.0 mm.

Subsequently, the specimens were subjected to sintering at a temperature of 1,500° to 1,800° C. and then annealed at a temperature of 1,250° to 1,400° C. at a suitable cooling rate.

Following completion of the annealing process, the resulting specimens were rapidly quenched to room temperature.

After the opposite surfaces of the specimens were evenly polished, the dielectric constants and the quality factors were measured at 9 GHz with a HP 8720C Network Analyzer using the Hakki Coleman method. The results are shown in Table 1.

Other features, advantages and embodiments of the invention disclosed herein will be readily apparent to those of ordinary skill in the art after reading the foregoing disclosures. In this regard, while specific embodiments of the invention have been described in considerable detail, variations and modifications of these embodiments can be effected without departing from the spirit and scope of the invention as described and claimed.

What is claimed is:

1. A dielectric ceramic composition for high frequencies, essentially consisting of zirconium oxide ($ZrO_2$) titanium oxide ($TiO_2$) and stannic oxide ($SnO_2$) represented by the following empirical formula:

$$Zr_{1-x}Sn_xTiO_4$$

wherein x is in a range of 0.1 to 0.4.

2. A method for preparing a dielectric ceramic composition for high frequencies, comprising the steps of:

mixing powdery zirconium oxide ($ZrO_2$) 1 titanium oxide ($TiO_2$) and stannic oxide ($SnO_2$) to give a mixture having the following empirical formula:

$$Zr_{1-x}Sn_xTiO_4$$

wherein x is in a range of 0.1 to 0.4;

calcining the mixture at a temperature of 1,000° to 1,200° C., sintering the calcined mixture at a temperature of 1,500° to 1,800° C.;

annealing the sintered body at a temperature of 1,250° to 1,400° C.; and rapidly quenching the resulting annealed body to room temperature.

TABLE 1

Compositions and Properties of Dielectric Ceramic Materials

| Specimen No. | Composition $Zr_{1-x}Sn_xTiO_4$ (mol) | Sinter Temp. (°C.) | Dielec. Const. (k) | Quality Factor (Q) | $\tau_f$ (ppm/°C.) | Anneal Time (h) | Anneal Temp (°C.) | Quench |
|---|---|---|---|---|---|---|---|---|
| 1 | x = 0.1 | 1750 | 39.1 | 6142 | 40 | 30 | 1250 | rapid |
| 2 | x = 0.2 | 1700 | 38.5 | 6640 | 30 | 30 | 1300 | rapid |
| 3 | x = 0.25 | 1600 | 37.8 | 6806 | 25 | 30 | 1300 | rapid |
| 4* | x = 0.25 | 1650 | 35.5 | 4646 | 35 | 10 | 1320 | slow |
| 5 | x = 0.3 | 1700 | 36.5 | 7000 | 10 | 30 | 1320 | rapid |
| 6 | x = 0.3 | 1550 | 37.4 | 6142 | 15 | — | — | rapid |
| 7* | x = 0.3 | 1580 | 34.3 | 4980 | 15 | — | — | slow |
| 8 | x = 0.4 | 1600 | 37 | 6640 | 50 | 30 | 1300 | rapid |
| 9* | x = 0.03 | 1550 | 40.2 | 2700 | 50 | 30 | 1300 | rapid |
| 10* | x = 0.5 | 1600 | 38.2 | 4000 | 100 | 30 | 1300 | rapid |

*: comparative specimen, "—": no annealing process
Quench: cooling from 1,200° C. to room temperature after sintering.

* * * * *